United States Patent
Sunaga et al.

(10) Patent No.: US 6,863,597 B2
(45) Date of Patent: Mar. 8, 2005

(54) CHIP COLLECTING APPARATUS FOR TIP DRESSER

(75) Inventors: Shouichi Sunaga, Tokyo (JP); Yuichiro Haruyama, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/175,605

(22) Filed: Jun. 18, 2002

(65) Prior Publication Data

US 2003/0002945 A1 Jan. 2, 2003

(30) Foreign Application Priority Data

Jun. 27, 2001 (JP) ........................................ 2001-195081

(51) Int. Cl.[7] .............................................. B24B 5/36
(52) U.S. Cl. ...................... 451/160; 451/56; 451/452; 451/454; 409/140; 219/119; 72/112
(58) Field of Search ................................ 451/110, 278, 451/48, 282, 375, 382, 389, 160, 451–457, 365, 56; 29/762, 33 R, 402.19; 219/119, 86.8; 72/112; 409/140, 181; 408/53

(56) References Cited

U.S. PATENT DOCUMENTS

| | | | | |
|---|---|---|---|---|
| 2,930,289 A | * | 3/1960 | Swarts ......................... 408/53 |
| 4,541,760 A | * | 9/1985 | Zoueki ......................... 409/137 |
| 4,610,153 A | * | 9/1986 | Nedorezov ..................... 72/112 |
| 4,771,577 A | * | 9/1988 | Abe et al. ..................... 451/160 |
| 4,856,949 A | * | 8/1989 | Shimada ....................... 409/140 |
| 5,400,546 A | * | 3/1995 | Christian et al. ............ 451/143 |
| 5,993,125 A | * | 11/1999 | Shimada ....................... 409/140 |
| 6,106,372 A | * | 8/2000 | Clark ........................... 451/56 |
| 6,186,876 B1 | | 2/2001 | Christiansen |
| 6,195,860 B1 | * | 3/2001 | Di Rosa et al. ............. 29/33 R |
| 6,518,537 B1 | * | 2/2003 | Tezawa ........................ 219/119 |

FOREIGN PATENT DOCUMENTS

| | | | |
|---|---|---|---|
| EP | 1186369 A1 | 9/2001 | |
| JP | 3-18067 | 4/1991 | ........... B23K/11/30 |
| JP | 6-122082 | 5/1994 | ........... B23K/11/30 |

* cited by examiner

Primary Examiner—George Nguyen
(74) Attorney, Agent, or Firm—Darby & Darby

(57) ABSTRACT

In a chip collecting apparatus for a tip dresser of the present invention, a chip pickup case mounted on a dresser main body is divided into an upper case and a lower case, and the lower end of an arm admission port formed in the upper case is opened downward. During teaching operation, the lower case is rotated to open the lower end of the upper case, through which the insertion of a first gun arm into a lower chamber can be visually checked, and thus an electrode tip provided at the end thereof and a dressing body for dressing the end of the electrode tip are guided such that the central axes thereof conform to each other.

4 Claims, 9 Drawing Sheets

CHIP COLLECTING APPARATUS FOR TIP DRESSER

BACKGROUND OF THE INVENTION

1. Field of the Invention

The present invention relates to a chip collecting apparatus for a tip dresser for collecting chips generated when dressing electrode tips.

2. Description of the Related Art

Conventionally, electrode tips used for spot welding or the like are worn out (or deformed) when welding work is repeated. When welding work is performed with a worn-out electrode tip, welding of desired quality cannot be obtained; accordingly, electrode tips are periodically dressed to maintain welding quality.

For example, Japanese Unexamined Patent Application Publication No. 6-122082 discloses a tip dresser for dressing electrode tips in which after the upper and lower surfaces of a dressing body have been tightly pressed by a pair of electrode tips provided at opposed ends of a welding gun, and the welding gun is swung around the central axis of each electrode tip for grinding, thereby dressing the electrode tips.

Recently, the recycle of chips is contemplated in view of cost reduction and environmental issues. Accordingly, a collection vessel is disposed under the dressing body to recycle the collected chips.

However, there is a problem in that the chips tend to be released by the relative swing or rotation of the dressing body and the electrode tips during grinding work, and all the chips cannot be collected into the collection vessel, resulting in a low collection rate.

Furthermore, when air is blown to the dressing body to prevent clogging of the dressing body, the chips are released by the blown air, so that the collection rate of the chips is further decreased.

Generally, copper is often used as an electrode tip for spot welding and the like. In order to maintain a proper welding quality, the frequency of grinding is increased to increase the amount of ground chips of the electrode tip, so that, in order to reduce material cost, it is necessary to increase the collection rate of the chips and effectively recycle them.

For this purpose, various techniques are proposed in which a chip collecting apparatus is mounted on the dresser main body having a dressing body for collecting chips generated during dressing the electrode tips.

For example, Japanese Examined Utility Model Publication No. 3-18067 discloses a technique of collecting chips generated during polishing or grinding electrode tips in such a way that a cover main body is mounted on a dresser main body, and an air inlet and an air outlet are formed between the upper and lower surfaces of the cover main body and the dresser main body. Compressed air after driving a dressing body held by a holder is guided through the air inlet to the holder, and then the compressed air is guided through the air outlet to a chip collection vessel connected to the end of the cover main body.

In general, the operation of moving the welding gun provided at the end of the welding robot toward the chip dresser is often memorized by teaching in advance.

However, when the cover main body for collecting the chips generated during dressing operation is mounted on the dresser main body, as in the above prior art, it becomes difficult to visually recognize the positional relationship between the electrode tips and the dressing body; therefore, it is necessary to temporarily remove the cover main body from the dresser main body and to perform teaching, posing a problem in increasing the number of processing steps required for teaching.

Furthermore, since the dresser main body is covered by the cover main body, the dressed state of the electrode tips cannot be checked from the exterior, causing inconvenience of being unable to check faulty dressing such as insufficient dressing and excessive dressing.

SUMMARY OF THE INVENTION

Accordingly, it is an object of the present invention to provide a chip collecting apparatus for a tip dresser capable of easily checking the positional relationship between electrode tips and a dressing body during teaching operation without detaching the whole device, significantly reducing processing steps required for teaching, and easily checking the presence or absence of faulty dressing during dressing operation from the exterior.

In the chip collecting apparatus for a tip dresser according to the present invention, including a tip dresser for dressing the electrode tips by pressing the electrode tips to a dressing body held by a dresser main body and relatively sliding the dressing body and the electrode tips, the dresser main body has a chip pickup case for covering the dressing body mounted thereon, the chip pickup case has an arm admission port allowing the insertion of gun arms having the electrode tips at the ends, the arm admission port has a shielding member allowing the insertion of the gun arms by elastic deformation, and the chip pickup case is divided in the vicinity of the arm admission port such that it can freely be opened and closed.

With such a configuration, the chip pickup case is divided in the vicinity of the arm admission port such that it can be opened and closed. Accordingly, during teaching operation, the divided portion of the chip pickup case is opened, so that the positional relationship between the electrode tips held at the ends of the gun arms and the dressing body can be recognized from the exterior.

The above and other objects, features and advantages of the invention will become more clearly understood from the following description referring to the accompanying drawings.

BRIEF DESCRIPTION OF THE DRAWINGS

FIGS. 1 to 4 show a chip collecting apparatus according to a first embodiment of the present invention; wherein FIG. 1 is a general perspective view of the chip collecting apparatus;

FIG. 2 is a front view of the chip collecting apparatus;

FIG. 3 is a sectional view of the apparatus of FIG. 2 taken along the line III—III;

FIG. 4 is a sectional view of the apparatus of FIG. 3, in a different operation;

FIGS. 5 to 9 show a chip collecting apparatus according to a second embodiment of the present invention; wherein FIG. 5 is a perspective view of a chip pickup case seen from the front downward;

FIG. 6 is a perspective view of the chip pickup case into which a welding gun advances, seen from the front obliquely downward;

FIG. 7 is a perspective view of the chip pickup case during dressing operation, seen from the front obliquely above;

FIG. 8 is a perspective view of the chip pickup case during teaching operation, seen from the front downward; and FIG. 9 is a perspective view of a chip pickup case according to a third embodiment of the present invention.

DETAILED DESCRIPTION OF THE PREFERRED EMBODIMENTS

Figure 1:
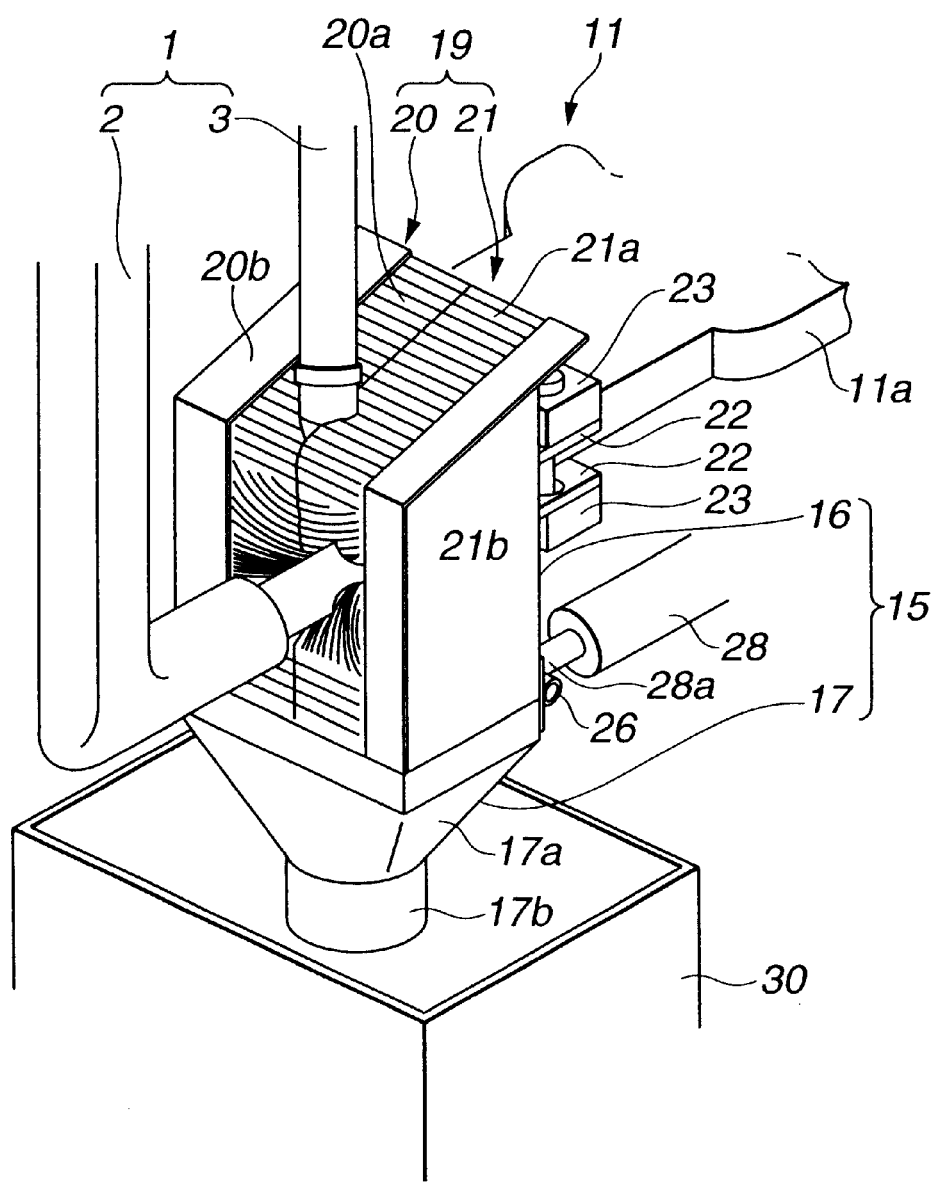

FIGS. 1 to 4 show a first embodiment of the present invention.

Reference numeral 1 denotes a welding gun 1, such as a C-type welding gun, connected to a welding robot. The welding gun 1 has first and second gun arms 2 and 3, to the ends of which electrode tips 4 and 5 are detachably attached to face each other. The electrode tips 4 and 5 are coaxially disposed and are relatively brought into close proximity to and apart from each other by advancing and retracting motions of at least one of the gun arms 2 and 3.

Furthermore, a tip dresser 11 for dressing the ends of the electrode tips 4 and 5 is disposed at a position not to interfere with welding work in the range of operation of the welding robot.

A dresser main body 11a extending laterally from the tip dresser 11 has a holder 12 at the end thereof for rotatably holding a dressing body 13. The dressing body 13 is driven to rotate by a motor 14 hung from the dresser main body 11a, and has concave cutters 13a and 13b on the lower and upper surfaces thereof, the cutters being capable of dressing the ends of the electrode tips 4 and 5 into a predetermined shape by polishing or grinding.

The dresser main body 11a has a chip pickup case 15 mounted at the end thereof. The chip pickup case 15 is formed by working a resin mold or a thin steel sheet, and is divided into an upper case 16 and a lower case 17.

The top of the upper case 16 is slanting obliquely upward toward the rear. Also, an arm admission port 16a with a predetermined width is opened from the front to the top of the upper case 16, and the lower end of the arm admission port 16a passes through the lower end of the upper case 16. A hole 16b penetrating the end of the dresser main body 11a is formed at the upper back of the upper case 16.

A shielding member 19 is secured to the arm admission port 16a. The shielding member 19 is composed of a pair of brush sections 20 and 21 arranged to face each other on the right and left sides of the arm admission port 16a. The bases of brushes 20a and 21a made of nylon or the like and provided at the brush sections 20 and 21, respectively, are fastened to the rim of the arm admission port 16a with plates 20b and 21b.

The ends of the brushes 20a and 21a are brought into contact with each other substantially at the center of the width of the arm admission port 16a, so that the whole arm admission port 16a is covered from the front to the top by the brushes 20a and 21a. Thus, the brushes 20a and 21a prevent chips generating while the electrode tips 4 and 5 are dressed from flying off to the exterior through the arm admission port 16a.

Also, supporting plates 22 are disposed at the upper and lower four corners of the hole 16b formed at the back of the upper case 16. The front end of each supporting plate 22 is extended horizontally toward the arm admission port 16a, the end of which is connected to the inner edge of the arm admission port 16a, and contact portion with the hole 16b is joined together.

When the end of the dresser main body 11a is inserted into the hole 16b, the upper and lower edges are positioned in a state in which they are supported by the supporting plates 22. The upper case 16 is divided into an upper chamber 16e and a lower chamber 16f by the dresser main body 11a, and the upper and lower surfaces of the dressing body 13 supported by the holder 12 provided at the end of the dresser main body 11a are exposed to the upper chamber 16e and the lower chamber 16f.

The rear portions of the supporting plates 22 project outward from the hole 16b. A pair of fixing blocks 23 is brought into contact with the projecting portions from above and down, and both ends of the fixing blocks 23 are fastened with bolts 24, thereby fixing the dresser main body 11a.

An air nozzle 25 is secured to the back of the upper chamber 16e of the upper case 16, and the end of the air nozzle 25 is oriented to the dressing body 13 exposed to the upper chamber 16e. Chips adhered to the dressing body 13 is released by air blown out from the air nozzle 25, thereby preventing clogging of the dressing body 13.

Figure 2:
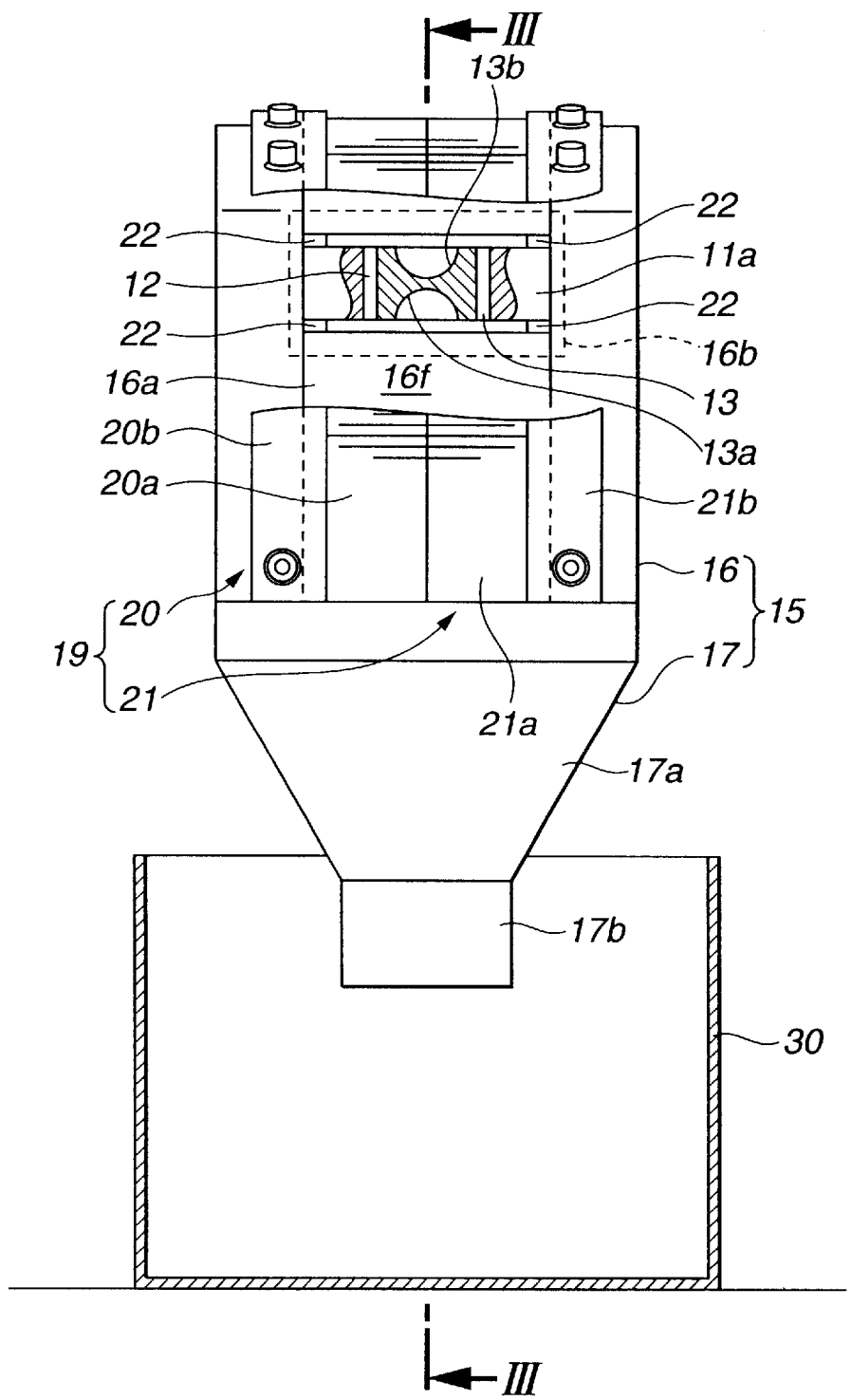
Figure 3:
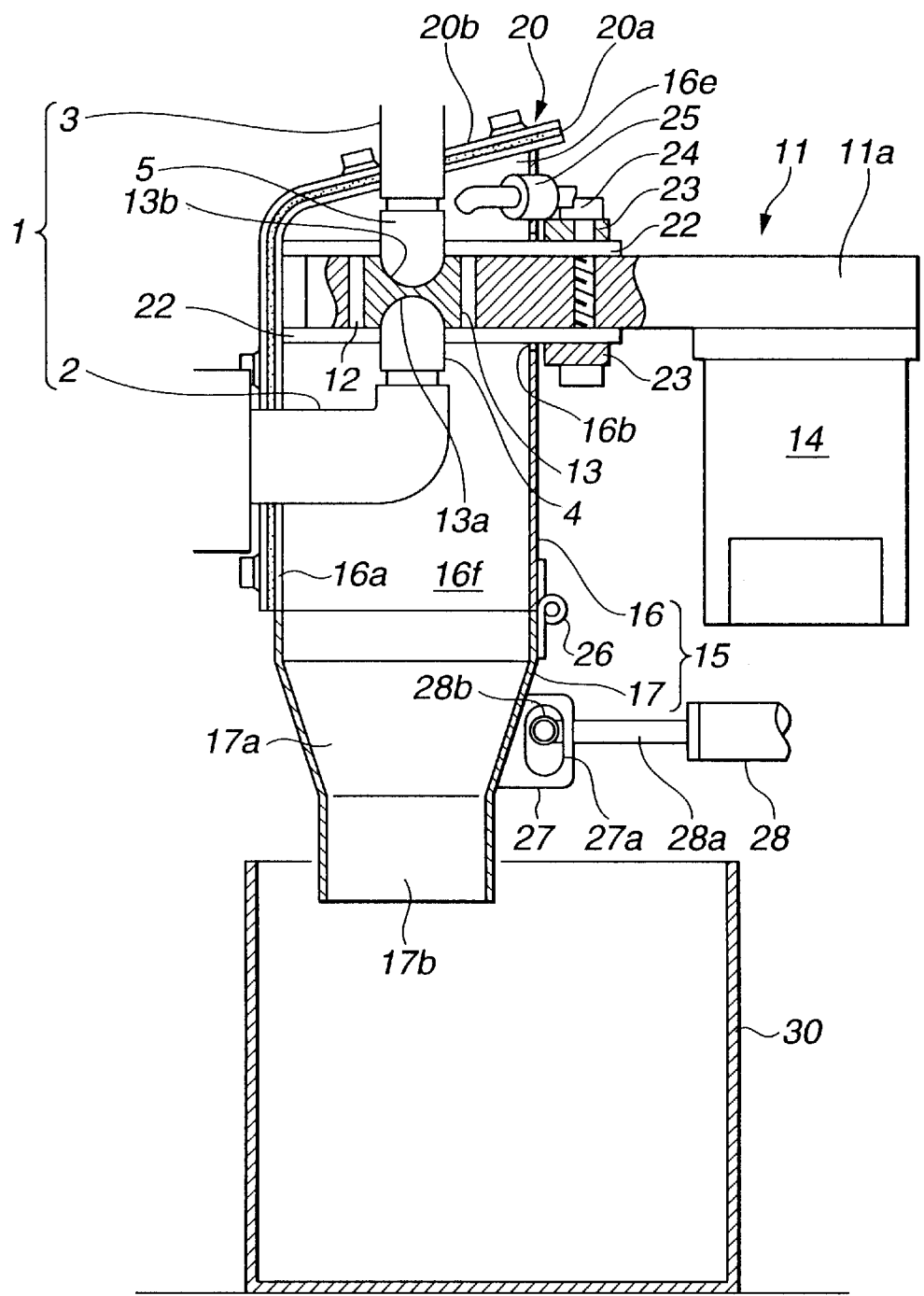

As shown in FIGS. 2 and 3, the upper chamber 16e and the lower chamber 16f are communicated with each other through a void formed between the inner wall of the upper case 16 and a void formed in the holder 12.

Figure 4:
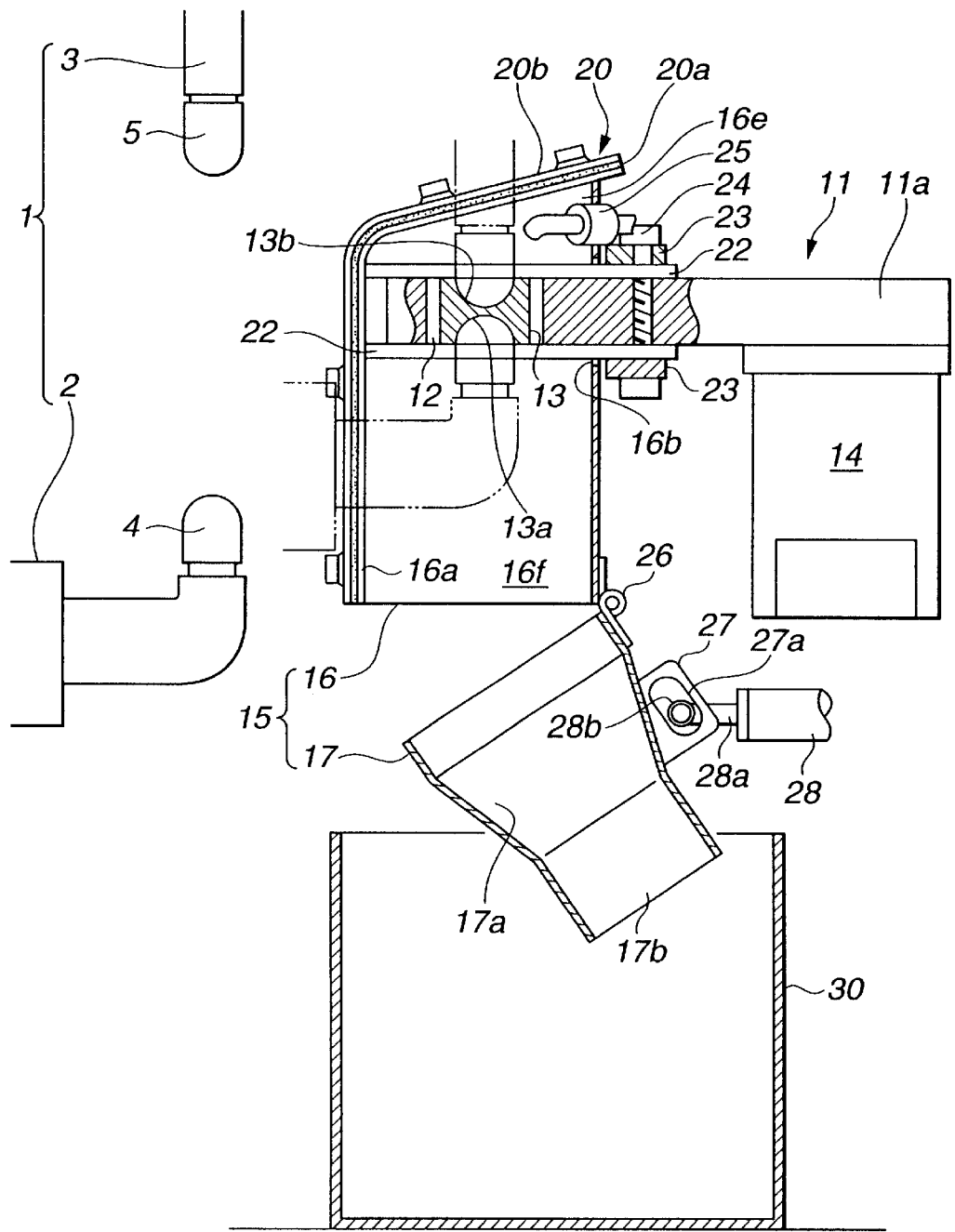

On the other hand, the upper end back of the lower case 17 is rotatably supported at the lower end back of the upper case 16 with a hinge 26. The upper end outer periphery of the lower case 17 is formed along the lower end outer periphery of the upper case 16. The lower case 17 freely opens and closes the upper case 16 around the hinge 26, as shown in FIGS. 3 and 4. A bracket 27 projects from the back of the lower case 17, and a slotted hole 27a extending vertically is formed in the bracket 27.

An end 28b of a plunger 28a of an air cylinder 28, the rear end of which is secured to a column (not shown) or the like of the tip dresser 11, is engaged with the slotted hole 27a. The plunger 28a of the air cylinder 28 is retracted and held ready in a state in which the front of the lower case 17 is opened, as shown in FIG. 4. When the first gun arm 2 provided for the welding gun 1 is positioned in the lower chamber 16f, the plunger 28a projects, and thus, the upper end of the lower case 17 is brought into contact with the lower end of the upper case 16 for closing, as shown in FIG. 3.

The lower case 17 has a tapered chip guide surface 17a converging downward at the upper part thereof, under which a chip discharge port 17b opened downward is formed. Furthermore, a chip collection vessel 30 is formed under the chip discharge port 17b.

In this case, it is possible to use the lower part of a plastic bottle, the upper part of which is cut off under the neck, as a chip collection vessel 30. In this case, the rim of the upper opening of the chip collection vessel 30 formed of a plastic bottle may be hung from the chip discharge port 17b of the lower case 17.

Next, the operation of this embodiment with such a configuration will be discussed. The lower case 17 provided for the chip pickup case 15 is held ready with the front part opened, as shown in FIG. 4. When the welding robot is taught the operation of dressing, the pair of electrode tips 4 and 5 provided at the ends of the welding robot, which is set in a teaching mode, is guided to the dressing body 13 held by the holder 12 of the dresser main body 11a, with the lower case 17 being in a standby state (in a state in FIG. 4). At this time, since the lower end of the upper case 16 is opened, the electrode tip 4 mounted at the end of the first gun arm 2 can easily be guided into the lower chamber 16f of the upper case 16, and the central axis of the electrode tip 4 can be accurately conformed to the central axis of the cutter 13a of the dressing body 13 while it is visually checked, high workability is provided.

Since the lower end of the arm admission port 16a covered by the pair of opposite brushes 20a and 21a is also opened, the gun arm 2 can smoothly be guided into the lower chamber 16f. At this time, when the chip collection vessel 30 is obstructive, it is moved out of the way in advance.

When the teaching during dressing operation has been completed in a predetermined way, the welding robot is moved, and the welding gun 1 is moved apart from the chip pickup case 15 and held ready in position.

Subsequently, dressing operation of the electrode tips 4 and 5 will be described. First, the pair of gun arms 2 and 3 provided for the welding gun 1 is moved toward the dresser main body 11a with a predetermined space left therebetween, in accordance with preset teaching.

Both the gun arms 2 and 3 are brought in close vicinity of the front of the upper case 16; the first gun arm 2 passes through the brushes 20a and 21a to advance into the lower chamber 16f of the upper case 16; and the second gun arm 3 is arranged at the upper part of the upper case 16. At this time, since the lower end of the lower case 17 is opened, the first gun arm 2 can be advanced from the lower part of the arm admission port 16a into the lower chamber 16f without interfering with the lower case 17, as shown in FIG. 4.

Then, the central axis of the electrode tip 4 mounted at the end of the first gun arm 2 is arranged onto the central axis of the dressing body 13 disposed on the holder 12 provided for the dresser main body 11a. At this time, since the electrode tip 4 and the electrode tip 5 mounted at the end of the second gun arm 3 are arranged on the same axis, the electrode tip 5 is also arranged on the central axis of the dressing body 13.

Furthermore, the gun arms 2 and 3 are moved to bring the electrode tips 4 and 5 relatively close to each other. Then, the first gun arm 2 rises toward the arm admission port 16a, elastically deforms the brushes 20a and 21a blocking the arm admission port 16a along the outside shape of the first gun arm 2, and brings the electrode tip 4 provided at the end thereof into contact with the cutter 13a provided at the lower surface of the dressing body 13. At the same time, the electrode tip 5 provided at the end of the second gun arm 3 passes through the brushes 20a and 21a from the above of the dresser main body 11a to be positioned in the upper chamber 16e.

At this time, the brushes 20a and 21a disposed at the front and top of the upper case 16 are elastically deformed along the outer peripheries of the gun arms 2 and 3, and the peripheries of the gun arms 2 and 3 are closed.

On the other hand, when the first gun arm 2 is placed in position in the lower chamber 16f of the upper case 16, the plunger 28a of the air cylinder 28 projects in synchronization therewith to rotate the lower case 17 clockwise, as shown in FIG. 4, and to bring the upper end of the lower case 17 into contact with the lower end of the upper case 16, thereby integrating the lower chamber 16f therein with the chip guide surface 17a.

When the electrode tips 4 and 5 are further brought close to each other, they are brought into contact with the cutters 13a and 13b provided on the lower and upper surfaces of the dressing body 13, respectively, and press the dressing body 13 therebetween. The dressing body 13 is driven to rotate by the motor 14 provided for the dresser main body 11a, and air is blown out from the air nozzle 25 positioned in the upper chamber 16e toward the dressing body 13.

Chips adhered to the dressing body 13 is blown off by the air. The air blown to the dressing body 13 flows through a gap in the dressing body 13 and the void formed around the dresser main body 11a toward the lower chamber 16f, and is blown to the exterior through the brushes 20a and 21a blocking the front of the lower chamber 16f and the chip discharge port 17b.

On the other hand, the chips generated when the cutters 13a and 13b provided for the dressing body 13 dress the electrode tips 4 and 5 by polishing or grinding are guided toward the lower chamber 16f by air blow from the air nozzle 25 positioned in the upper chamber 16e. At this time, the chips guided by air leaking out through the brushes 20a and 21a come into collision with the inner side of the brushes 20a and 21a and drop toward the bottom of the lower chamber 16f.

The chips dropping toward the bottom of the lower chamber 16f are guided toward the chip discharge port 17b along the chip guide surface 17a, and are collected into a chip collection vessel 30 disposed under the chip discharge port 17b.

When dressing of the electrode tips 4 and 5 has been completed in a predetermined way, the plunger 28a of the air cylinder 28 retracts in synchronization therewith, and the lower case 17 is thereby rotated around the hinge 26, and is set in a standby state in which the front lower end of the upper case 16 is opened, as shown in FIG. 4.

Next, the welding robot is operated to separate the first and second gun arms 2 and 3 from the dresser main body 11a by a reverse operation to that when advancing them and to bring them into a standby state for the next spot welding.

When the chips collected into the chip collection vessel 30 reach a designated amount, or periodically, the chips collected in the chip collection vessel 30 are recycled.

According to this embodiment, as described above, since the chip pickup case 15 is divided into the upper case 16 and the lower case 17, when teaching is performed to the welding robot, the electrode tip 4 provided at the end of the first gun arm 2 and the dressing body 13 can be positioned while the positional relationship therebetween is checked visually; therefore, high workability can be provided.

Since the lower case 17 maintains an opened state until the first gun arm 2 is located in position in the lower chamber 16f of the upper case 16, the first gun arm 2 can be advanced into the lower chamber 16f from the lower part of the upper case 16. As a result, there is no need to downwardly expand the arm admission port 16a formed at the front of the upper case 16 in order to prevent the interference with the first gun arm 2, allowing the entire length of the chip pickup case 15 to be significantly decreased in a state in which the lower case 17 is closed, so that downsizing can be achieved.

FIGS. 5 to 8 show a second embodiment of the invention. A chip pickup case 31 according to this embodiment is divided into an upper case 32 and a lower case 33 having a bottom and acting as a chip collection vessel. The upper case 32 can be freely opened and closed left and right at the front side thereof. More specifically, the upper case 32 includes a back plate 34, both-side plates 35 and 36, and front flanges 35a and 36a formed by bending the front edges of the both-side plates 35 and 36. The rear edges of the both-side plates 35 and 36 and both side edges of the back plate 34 are connected with each other with spring hinges 37. The spring hinges 37 constantly apply a force to open the both-side plates 35 and 36 outward around it.

Also, the base ends of receiving plates 38, which extend in opposite directions and the ends of which overlap vertically in a state in which the both-side plates 35 and 36 are closed (a state of FIG. 7), are supported by the both-side plates 35 and 36 on the bottom side of the dresser main body 11a with hinges 39 such that they can freely rotate vertically. One end of a stay 40 is rotatably supported at the lower surface of each receiving plate 38, and the other end of the stay 40 is freely brought into and out of engagement with the hook 41 secured to the inside lower part of each of the side plates 35 and 36.

Figure 5:
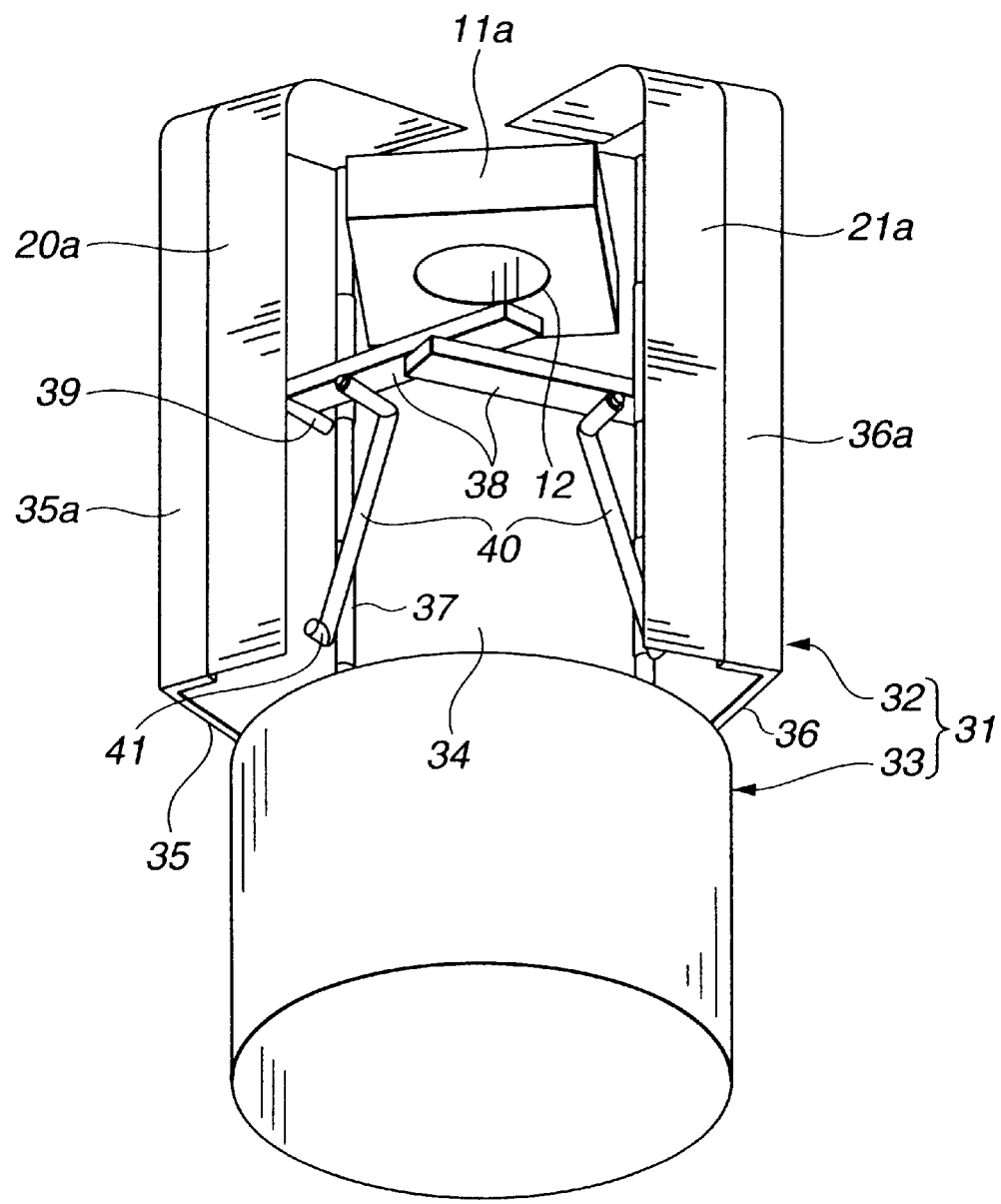

In a state in which the both-side plates 35 and 36 are opened, as shown in FIG. 5, the ends of the receiving plates 38 extending from the inner surfaces of the both-side plates 35 and 36 intersect each other.

Figure 8:
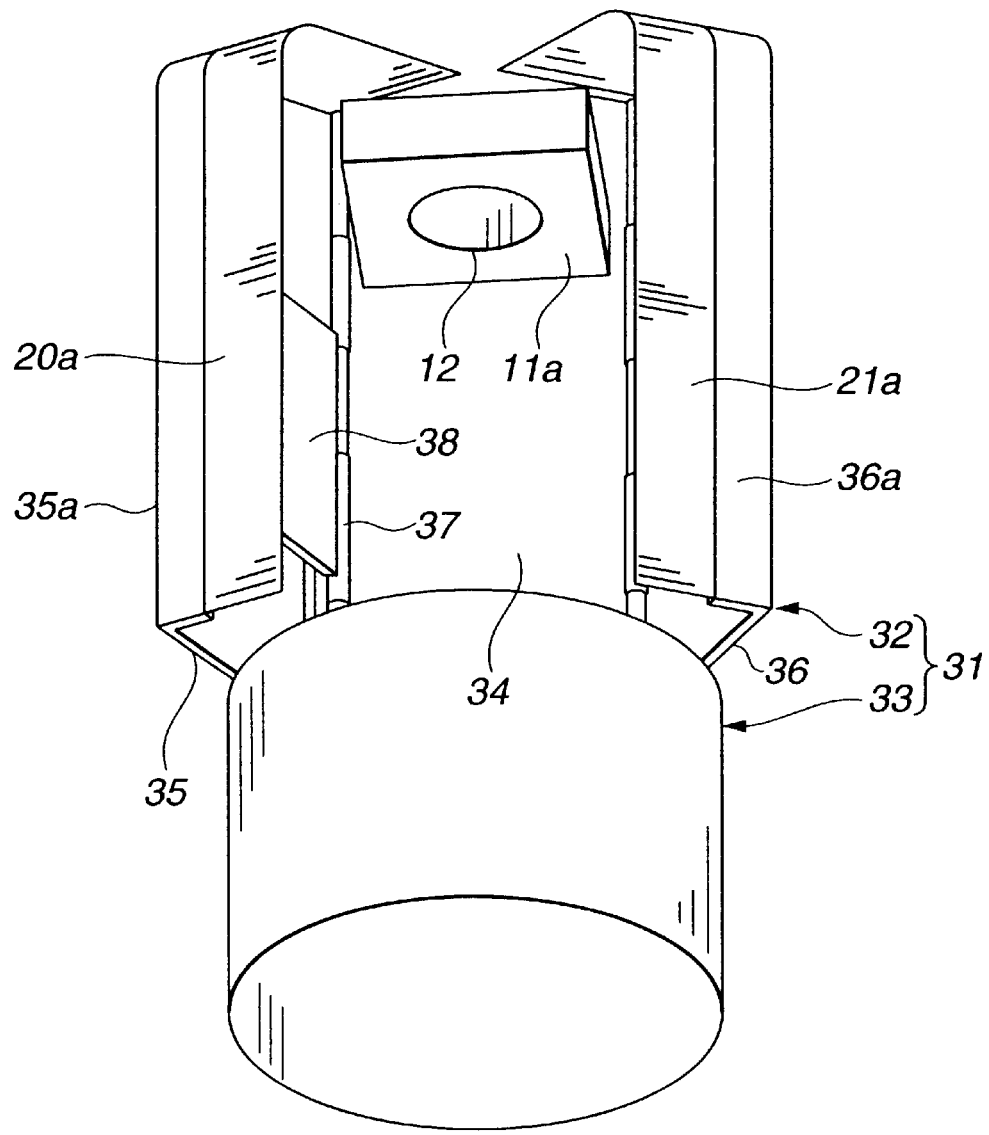

With such a configuration, when the operation at the time of dressing is taught to the welding robot, first, the ends of the stays 40 supporting the receiving plates 38 are disengaged from the hooks 41 secured to the both-side plates 35 and 36. Then, as shown in FIG. 8, the receiving plates 38 are rotated downwards around the hinges 39 and stand still in substantially parallel to the inner surfaces of the both-side plates 35 and 36.

Subsequently, the welding robot set in a teaching mode is operated, as is the first embodiment, to guide the gun arms 2 and 3 provided for the welding gun (C-type welding gun in the drawing) 1 toward the dressing body 13 held by the holder 12 of the dresser main body 11a from the front toward the upper case 32.

At this time, since the both-side plates 35 and 36 of the upper case 32 are opened outwards by the urging force of the spring hinges 37, the electrode tips 4 and 5 mounted at the ends of the gun arms 2 and 3 can be accurately guided to the dresser main body 11a from the front, and also, the central axes of the electrode tips 4 and 5 can be accurately conformed to the central axes of the cutters 13a and 13b provided at both sides of the dressing body 13 while it is visually checked from the outside. Accordingly, high workability can be obtained while teaching is performed.

After the teaching operation has been completed in a predetermined way, the receiving plates 38 are raised, and an end of each stay 40, the other end of which is supported on the bottom of the receiving plate 38, is engaged with the hook 41 secured to the inner surface of each of the side plates 35 and 36, and the receiving plates 38 are set in a standby state in which the ends thereof overlap, as shown in FIG. 5.

Subsequently, a case of dressing the ends of the electrode tips 4 and 5 will be described. First, the pair of gun arms 2 and 3 provided for the C-type welding gun 1 is moved toward the dresser main body 11a in accordance with preset teaching.

Figure 6:
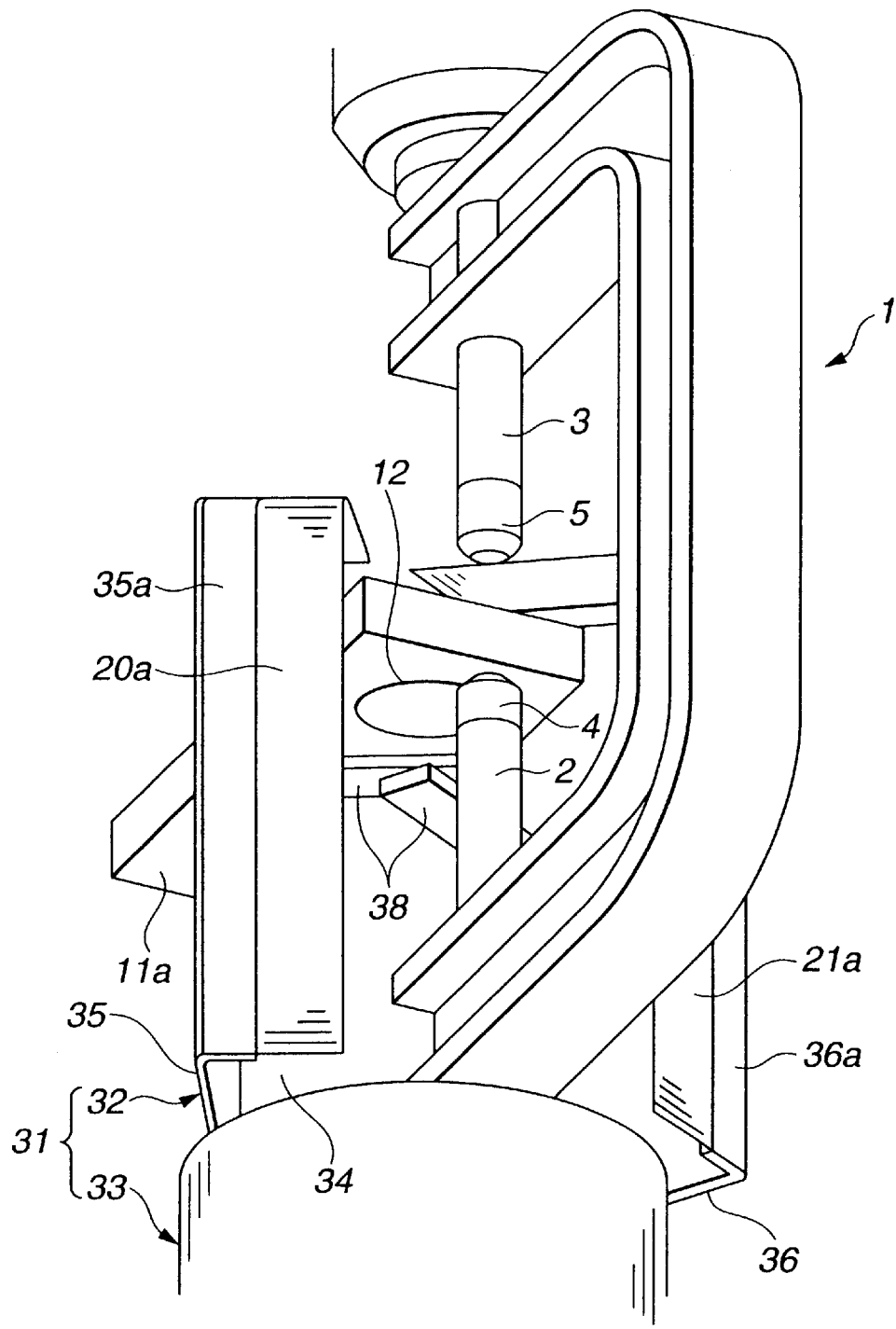
Figure 7:
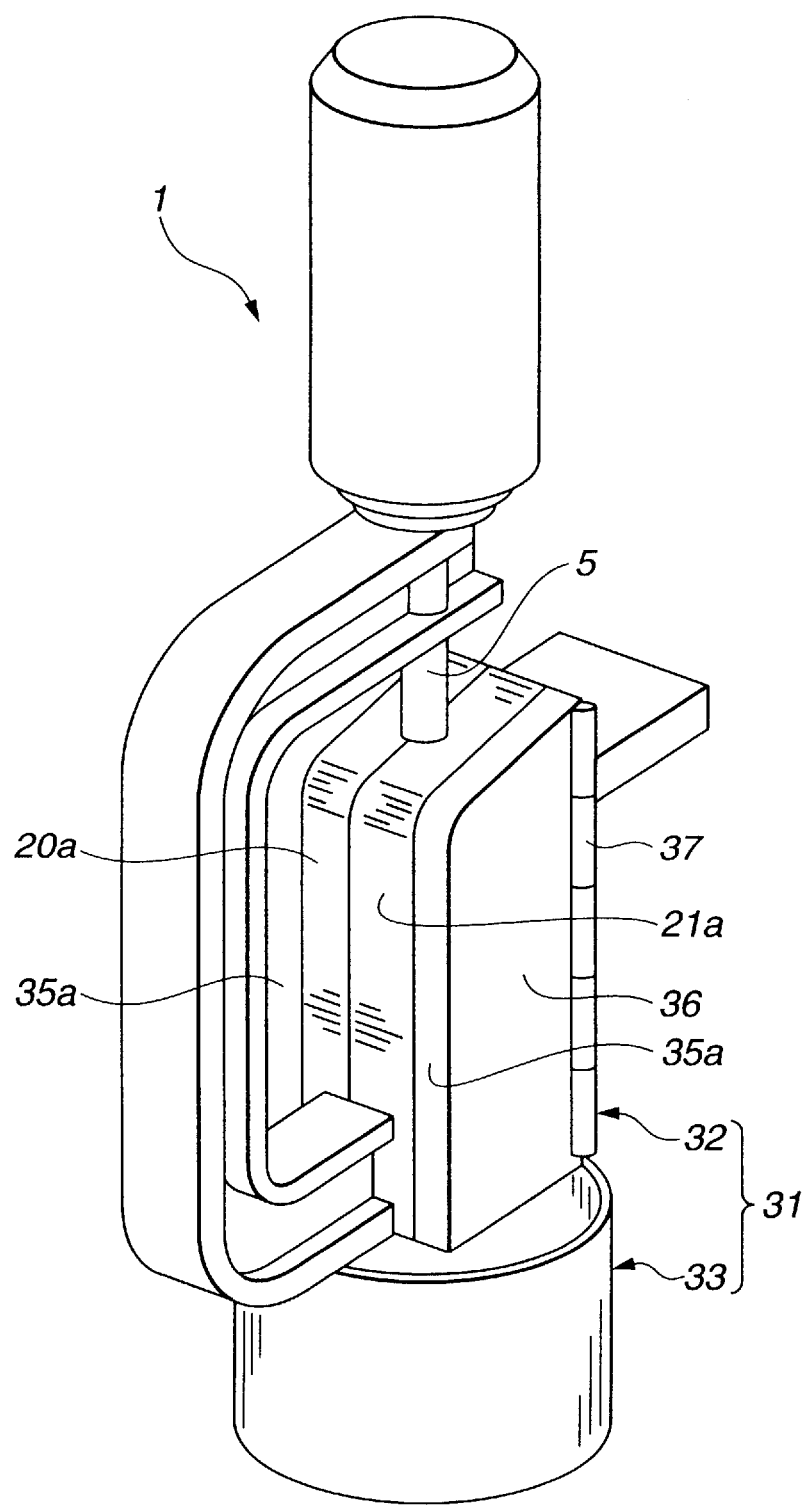

Next, the first gun arm 2 is advanced into the upper case 32 from the front of the upper case 32. Then, the end of the first gun arm 2 or the electrode tip 4 provided at the end of the first gun arm 2 is brought into contact with the ends of the receiving plates 38 extending from the inner surfaces of the both-side plates 35 and 36, as shown in FIG. 6.

The ends of the receiving plates 38 intersect each other. When the first gun arm 2 is further advanced into the interior, the ends of the receiving plates 38 are pushed, and the both-side plates 35 and 36 connected to the receiving plates 38 are rotated in a direction to close each other around the spring hinges 37 against the urging force of the spring hinges 37.

When the central axes of the electrode tips 4 and 5 are positioned on the central axis of the dressing body 13 disposed on the holder 12 provided for the dresser main body 11a, the ends of the brushes 20a and 21a, which are secured to the front flanges 35a and 36a bent from the both-side plates 35 and 36 forwardly, are brought into contact with each other to block the front and the top of the upper case 32, and also to block the peripheries of the gun arms 2 and 3 by elastic deformation of the brushes 20a and 21a.

The positional relationship between the first gun arm 2 or the electrode tip 4 and the receiving plates 38 is controlled by adjusting the attachment positions of the receiving plates 38 or varying the widths of the receiving plates 38.

After the dressing of the electrode tips 4 and 5 has been completed in a predetermined way, the welding robot is operated to separate the first and second gun arms 2 and 3 from the dresser main body 11a by the reverse operation to that when the first and second gun arms are advanced, the pushing force of the first gun arm 2 or the electrode tip 4 to the receiving plates 38 is gradually released, and the both-side plates 35 and 36 are gradually opened in synchronization with the retracting motion of the first gun arm 2 by the urging force of the spring hinges 37, thereby being returned to a standby state, shown in FIG. 5.

According to this embodiment, as described above, the both-side plates 35 and 36 of the upper case 32 are supported on the back plate 34 with the spring hinges 37, and they are opened at the front in a standby state. Accordingly, when teaching is performed to the welding robot, the central axes of the electrode tips 4 and 5 can be conformed to the central axes of the cutters 13a and 13b of the dressing body 13 while the positional relationship therebetween is checked visually; therefore, high workability can be provided. Furthermore, during dressing operation, since it can be visually checked immediately before the electrode tips 4 and 5 come close to the dressing body 13, faulty dressing can be found relatively easily.

Also, since opening and closing operations of the both-side plates 35 and 36 are performed by the advancing and retracing motions of the welding gun 1, which needs no power, the apparatus has a simple structure, and can be manufactured at low cost, and also it can easily be mounted on the dresser main body 11a, so that high operability can be provided. Of course, it is also possible that the both-side plates 35 and 36 are positively opened and closed by combination with the air cylinder and a link.

Figure 9:
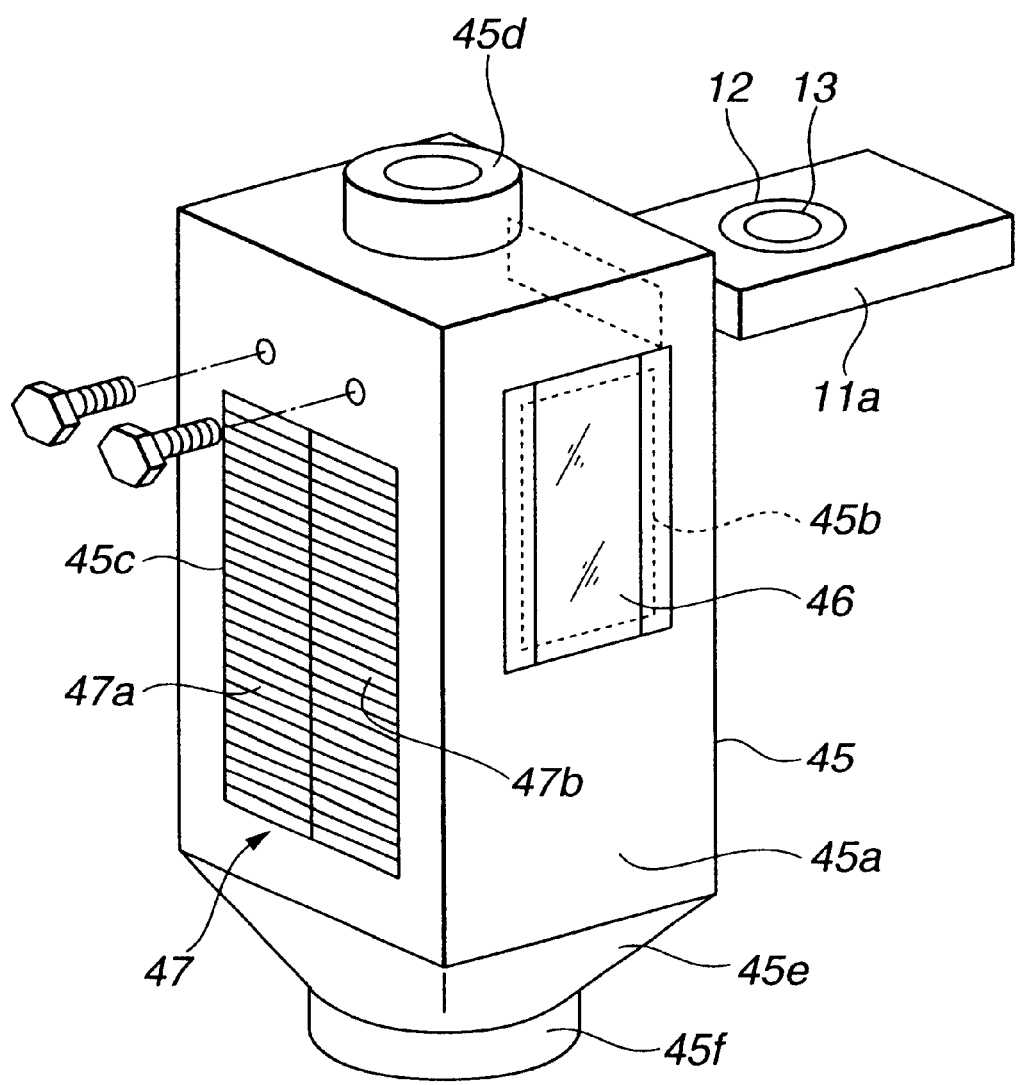

FIG. 9 shows a third embodiment of the invention.

A chip pickup case 45 according to this embodiment has a window 45b opened in a side 45a thereof, through which the positional relationship between the dressing body 13 and the electrode tips 4 and 5 can be visually checked, the window 45b being blocked by a transparent plate 46 made of acryl or the like.

An arm insertion port 45c opened in the front of the chip pickup case 45 is blocked by a pair of brushes 47a and 47b constituting a shielding member 47, and un upper-arm insertion port 45d is formed in the top of the chip pickup case 45 whereas a chip guide surface 45e is formed in a tapered shape at the bottom and a chip discharge port 45f is opened at the end thereof.

According to this embodiment, since the positional relationship between the electrode tips 4 and 5 supported by the welding gun 1 and advancing into the chip pickup case 45 and the dressing body 13 can be visually recognized through the window 45b from the exterior, not only the state in which teaching is performed but also the state in which dressing is performed can be recognized, so that faulty dressing such as insufficient dressing and excessive dressing can be prevented before they occur.

It is also possible that the window 45*b* is formed at both sides or at the back of the case 45. Also, it is possible that the window 45*b* is covered with a lid capable of being freely opened and closed, in stead of the transparent plate 46, and only when necessary, the lid is opened and the inside can be viewed therethrough.

The present invention is not limited to the above embodiments; for example, the brushes 20*a* and 21*a* may be rubber blades, and it is also possible to form the window shown in the third embodiment at the side or the back of the upper case 16 or 32, shown in the first and second embodiments, respectively.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

According to the present invention, as described above, the positional relationship between the electrode tips and the dressing body during teaching operation can easily be checked without detaching the whole device, thereby reducing the number of processing steps required for teaching.

Also, the presence or absence of faulty dressing during dressing operation can easily be checked from the exterior, thereby preventing faulty dressing.

What is claimed is:

1. A chip collecting apparatus for a tip dresser, comprising:
    a tip dresser for dressing electrode tips by pressing the electrode tips to a dressing body held in a dresser main body and relatively sliding the dressing body and the electrode tips;
    a chip pickup case mounted on the dresser main body for covering the dressing body; and
    an arm admission port opened in the chip pickup case, into which gun arms having the electrode tips at the ends thereof are inserted; and
    a shielding member disposed at the arm admission port for allowing the insertion of the gun arms by elastic deformation,
    wherein the chip pickup case is divided in the vicinity of the arm admission port such that it can freely be opened and closed.

2. The chip collecting apparatus for the tip dresser, according to claim 1, wherein:
    the chip pickup case is divided into an upper case and a lower case at the midpoint or the lower part of the arm admission port.

3. The chip collecting apparatus for the tip dresser, according to claim 1, wherein:
    the chip pickup case is divided to right and left at the arm admission port such that it can freely be opened and closed.

4. A chip collecting apparatus for a tip dresser, comprising:
    a tip dresser for dressing electrode tips by pressing the electrode tips to a dressing body held in a dresser main body and relatively sliding the dressing body and the electrode tips:
    a chip pickup case mounted on the dresser main body for covering the dressing body;
    an arm admission port opened in the chip pickup case, into which gun arms having the electrode tips at the ends thereof are inserted;
    a shielding member disposed at the arm admission port for allowing the insertion of the gun arms by elastic deformation; and
    a window provided at one side of the chip pickup case, through which the positional relationship between the dressing body and the electrode tips can be viewed.

* * * * *